Dec. 1, 1953 W. E. GIESE 2,660,980
RACE HORSE STARTING DEVICE
Filed Feb. 21, 1950 2 Sheets-Sheet 1
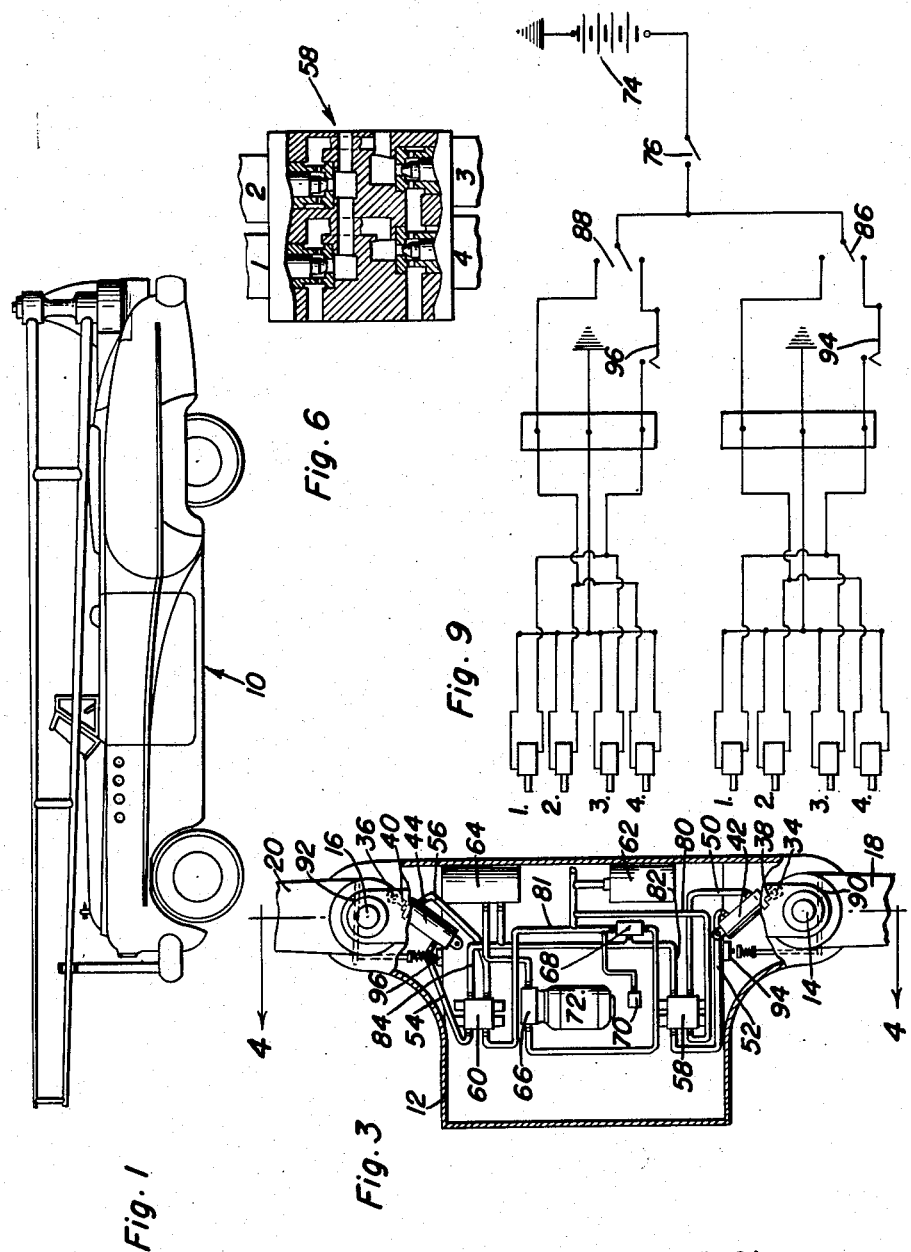
Walter E. Giese
INVENTOR.

Dec. 1, 1953 W. E. GIESE 2,660,980
RACE HORSE STARTING DEVICE
Filed Feb. 21, 1950 2 Sheets-Sheet 2
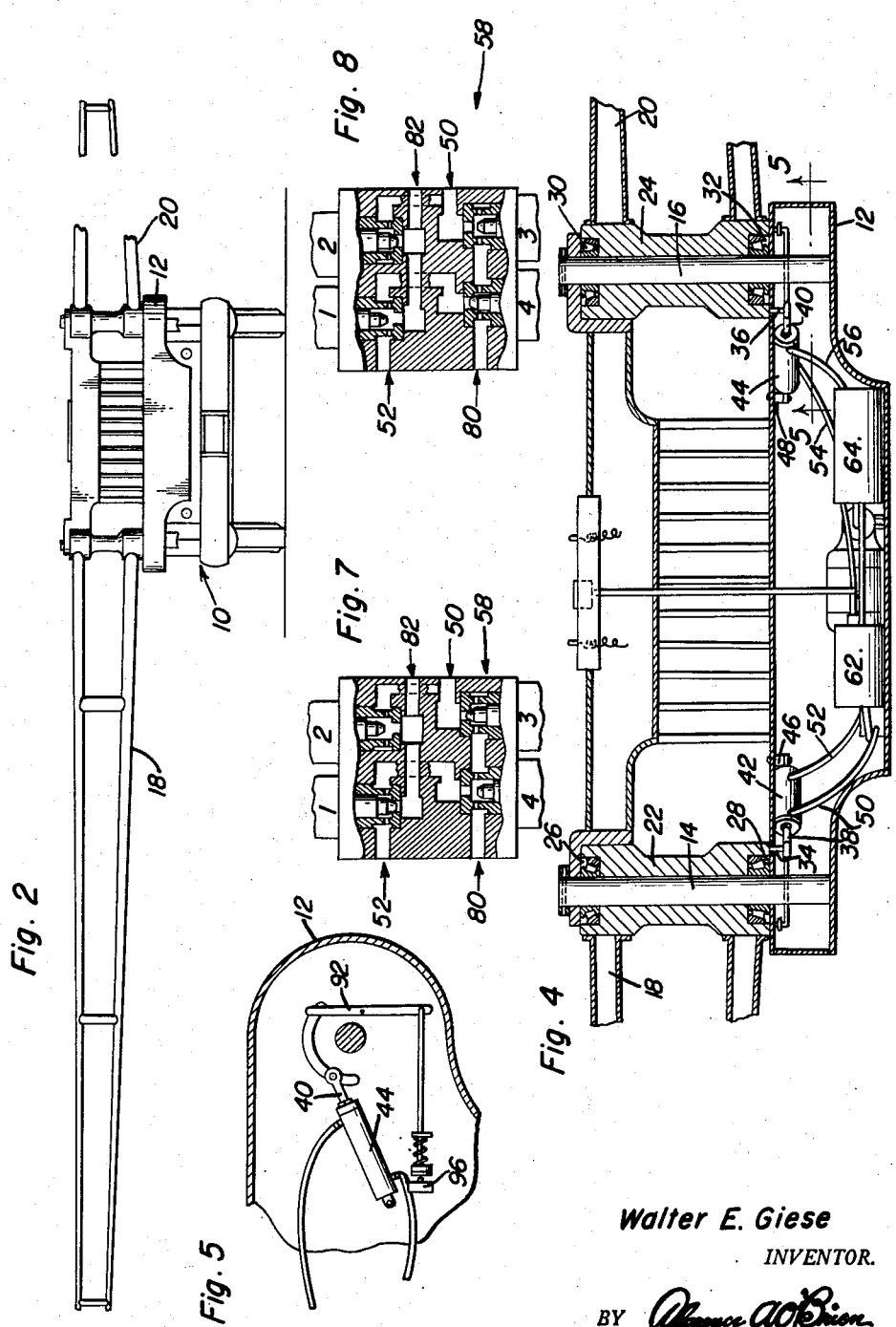
Walter E. Giese
INVENTOR.

Patented Dec. 1, 1953

2,660,980

UNITED STATES PATENT OFFICE 2,660,980

RACE HORSE STARTING DEVICE

Walter E. Giese, West Salem, Ill.

Application February 21, 1950, Serial No. 145,507

3 Claims. (Cl. 119—15.5)

1

This invention relates to a race horse starting gate and more particularly to a starting gate mounted on an automotive vehicle or the like which is adapted to be used for starting harness races.

An object of this invention is the provision of an automotive race horse starting gate which will enable a race starter to effectively and accurately start a group of horses in a harness race by giving them a running start.

Another object of this invention is to provide a race horse starting gate which is simply and easily controlled by the starter when the harness horses are properly lined up.

A further object of the invention resides in the provision of two gate arms pivotally mounted on the posts secured to an automotive vehicle, which arms are easily removed from the path of the race horses after the start.

Yet another object of the invention is to provide a race horse starting gate which will appear as an effective barrier to a horse and is so similar to an ordinary fence that it will not frighten a horse.

Another object of this invention is to provide a race horse starting gate which may be swung in the direction in which the horses are running and ahead of the horses so as to move out of their way, which arms are not swung up or operated in any manner so as to distract the horses.

Further objects of the invention reside in the provision of a race horse starting gate that is strong, durable, highly efficient in operation, very light and consequently easily and quickly removed, comparatively inexpensive, which starting gate simulates a fence or like structure so as to leave the horses unfrightened.

These, together with the various ancillary objects of the invention which will become apparent as the following description proceeds, are attained by this race horse starting gate, a preferred embodiment of which has been illustrated in the accompanying drawings, by way of example only, wherein:

Figure 1 is a side elevational view of the race horse starting gate shown mounted on the automotive vehicle used in this invention;

Figure 2 is a rear elevational view of the race horse starting gate;

Figure 3 is a top plan view of a housing for the actuating elements of the invention with part of the housing thereof being broken away to show the elements in greatest detail;

Figure 4 is an enlarged vertical sectional view as taken along the line 4—4 in Figure 3;

2

Figure 5 is a horizontal sectional view as taken along the line 5—5 in Figure 4;

Figures 6, 7 and 8 are sectional details showing the construction of the four-way valve used in the actuating elements for the race horse starting gate;

Figure 9 is a circuit diagram of the operative elements of the invention.

With continuing reference in the accompanying drawings wherein like reference numerals designate similar parts throughout the various views, reference numeral 10 generally designates an automotive vehicle on which a housing 12 is adapted to be emplaced. Extending through the housing 12 and supported by the vehicle 10 are a pair of upwardly extending posts or shafts 14 and 16 to which one end of the gate arms 18 and 20 are secured. The gate arms are provided with tubular elements 22 and 24 which are provided with recesses 26 and 28 and 30 and 32 in which suitable bearings may be emplaced.

Depending from the members 22 and 24 are crank pins 34 and 36 which are attached to the piston rods 38 and 40 of hydraulic cylinders 42 and 44. The hydraulic cylinders are held by anchors 46 and 48 to the housing 12. Hence, as the piston rods 38 and 40 are actuated the gate arms 18 and 20 will be rotated.

The cylinder 42 is supplied through fluid conduits 50 and 52 and conduits 54 and 56 are attached to the cylinder 44. These pairs of conduits are, in turn, connected to four-way solenoid actuated normally closed valves 58 and 60, respectively. Conduits connect the four-way valves 58 and 60 to a hydraulic accumulator 62. Connecting the hydraulic accumulator 62 with the reservoir tank 64 are suitable conduits connected with the pump 66, relief valve 68 and a pressure operated switch 70. The pump 66 is driven by a motor 72 which is energized by the battery 74 which is suitably mounted in the housing 12 or on such other part of the vehicle as may be desired.

To energize the motor 72 the master switch 76 is thrown which passes current to the pressure responsive switch 70 thereby permitting the motor 72 to start. The motor 72 drives pump 66 so as to draw the hydraulic fluid from the tank 64. The fluid is then pumped through the relief valve 68 into the hydraulic accumulator 62 where the pressure is raised to a point where the automatic pressure responsive switch 70 stops the motor. Conduits 81 and 80 connect the hydraulic accumulator 62 with the four-way valves 58 and 60. Return leads 82 and 84 connect the four-way valves with the reservoir 64. The four-way valves 58 and 60 are connected to each of the cylinders 42 and 44 so that by operating the valves fluid under pressure forces the piston in the hydraulic cylinders in either direction. This action is imparted to the crank pins 34 and 36 which, in turn, cause the arms 18 and 20 to open and close. The actuating coils 1, 2, 3 and 4 of the four-way normally closed control valves are actuated by two double-throw switches 86 and 88 which are mounted on a suitable control plane which switches are operatively electrically connected to the battery 74. By moving the switches one way or another the flow of the hydraulic fluid in the cylinder is reversed due to the action of the actuating coils on their armatures which form the four-way valves. To close the arms, hydraulic fluid is permitted to pass through the four-way valves to the lines 52 and 54 and into the cylinders 42 and 44 thereby actuating the piston rods to push the crank pins out and swing the gate arms 18 and 20 parallel to the automotive vehicle. When the arms reach the closing position the crank pins 34 and 36 will strike the arms 90 and 92 which automatically break the circuits in the micro-switches 94 and 96 which, in turn, breaks the circuit to the four-way solenoid operated valves. This, of course will stop the closing action when the arms reach the closed position. To open the arms to a position perpendicular to the automotive vehicle, the fluid is reversed by the action of the four-way valves thereby pulling the crank pins 34 and 36 back to the open position.

Figures 6, 7 and 8 show the construction of the four-way valves in detail. As can be readily seen, the four coils 1, 2, 3 and 4 are used to actuate the valves and move them to and from their valve seats, the valves being the armatures of the coils thus forming solenoids. The initial position is as shown in Figure 6, with the valves seated. When it is desired to open the arms, No. 1 and 3 coils are actuated thus permitting fluid flow as shown by the arrows in Figure 8. When it is desired to close the arms, No. 2 and 4 are actuated permitting the fluid flow as is shown in Figure 7.

In operation, this horse starting gate is placed in the center of a track about 100 yards before the starting wire. The arms are opened across the track perpendicular to the vehicle. On the arms are position numbers showing the position of each horse. The horses are brought onto the track and start toward the gate in the correct positions and, as they walk up to the gate, the vehicle is propelled forward with the horses increasing speed as the speed of the gate increases. The gate approaches the top speed of the raced horses just as the starting wire is reached. The operator then closes the arms parallel to the side of the vehicle and increases the speed above that of the horses and then pulls to the side of the track letting the horses go around the race track to a perfect start. The operator at all times stands at the controls facing the rear of the car so that he may readily see the action of the horses.

It is within the contemplation of the invention to install a complete sound system in the vehicle so that the operator can talk to the horsemen driving or riding the horses. This race horse starting gate in no way interferes with the view of those wishing to witness the start of the race and in fact, is most interesting to spectators.

Since from the foregoing the construction and advantages of this race horse starting gate are readily apparent, further description is believed to be unnecessary.

However, since numerous modifications will readily occur to those skilled in the art after a consideration of the foregoing specification and accompanying drawings, it is not intended to limit the invention to the precise embodiment shown and described, but all suitable modifications and equivalents may be readily resorted to which fall within the scope of the appended claims.

Having described the invention, what is claimed as new is:

1. A starting gate for horse races comprising an automotive vehicle a gate unit mounted on the vehicle containing swingable gates and a complete electrically controlled and operating mechanism, said gate mechanism including a pair of upright posts, a swingable gate arm on each post arranged on each side of the vehicle movable into a position at right angles to the vehicle and movable into a position alongside the vehicle, a hydraulic cylinder for each gate arm, a piston in each cylinder movable in both directions under the influence of hydraulic fluid, a crank mechanism connected with said piston for swinging the gate arm into its positions means operating each of said hydraulic cylinders including a valve assembly with a plurality of electrically operated normally closed solenoid valves controlling the admission and discharge of the hydraulic fluid at each end of the cylinder respectively, a pressure fluid system carried by said vehicle supplying fluid under pressure to the cylinders including a tank for the pressure fluid, an accumulator for storing fluid under pressure, a pump delivering fluid from said tank into said accumulator under pressure and an electric motor for driving said pump, current supply circuits connected to the solenoids of the solenoid valves with a common energizing circuit branch for all the solenoids of the solenoid valves controlling both hydraulic cylinders and with separate circuit branches connected to the solenoids of valves controlling the fluid admission to one side of each cylinder, manual change over switches alternatively closing the said separate circuit branches leading to different sides of one cylinder, a further manual switch in said common energizing branch controlling the energization of the controlling solenoids, an automatic switch in one of said separate circuit branches associated with each cylinder, means operating said automatic switch including an operating lever moved by said crank mechanism when the crank has reached a predetermined position, said automatic switch cutting off the current supply, de-energizing the solenoids and thereby cutting off the further admission of pressure fluid to the cylinder, a separate energizing circuit for the electric motor driving the pump, an electric control means for said energizing circuit, an operative supply circuit for said control means, and a fluid pressure responsive switch in the last named operative supply circuit interrupting said operative supply circuit when a predetermined fluid pressure has been reached in the system.

2. A starting gate for horse races comprising an automotive vehicle, a pair of upright posts supported by said vehicle, gate arms pivotally secured on said posts, cylinders carried by said vehicle, pistons in said cylinders, a crank mechanism terminally connected to said pistons and said gate arms, a hydraulic pressure assembly for moving said pistons including a valve assembly having a plurality of electrically operated normally closed solenoid valves connected to each end of said cylinders, said solenoid valves controlling the admission and discharge of hydraulic fluid to each end of said cylinders respectively, means supplying hydraulic fluid under pressure to said valve assembly connected thereto, current supply circuits connected to the solenoids of said solenoid valves, said supply circuits including a common energizing circuit branch and separate circuit branches connected to the solenoids of those valves which control fluid admission to one side of said cylinders, manual switches alternatively connecting said common energizing circuit branch and said separate circuit branches, automatic switches in said separate circuit branches, means carried by said vehicle operating the automatic switch when gate arm has reached its predetermined end position alongside the vehicle, means carried by said vehicle maintaining a predetermined fluid pressure within said hydraulic pressure system including a pump and an electric motor, and pressure responsive switching means in said hydraulic pressure system operated by the fluid pressure prevailing controlling the energization of the electric motor, said electric motor driving said pump, said electric motor being separately connected to a source of power carried by said vehicle.

3. A starting gate for horse races comprising an automotive vehicle, a pair of upright posts supported by said vehicle, gate arms pivotally secured on said posts, cylinders carried by said vehicle, pistons in said cylinders, a crank mechanism terminally connected to said pistons and said gate arms, a hydraulic pressure assembly for moving said pistons including a valve assembly having a plurality of electrically operated normally closed solenoid valves connected to each end of said cylinders, said solenoid valves controlling the admission and discharge of hydraulic fluid to each end of said cylinders respectively, means supplying hydraulic fluid under pressure to said valve assembly connected thereto, current supply circuits connected to the solenoids of said solenoid valves, said supply circuits including a common energizing circuit branch and separate circuit branches connected to the solenoids of those valves which control fluid admission to one side of said cylinders, manual switches alternatively connecting said common energizing circuit branch and said separate circuit branches, automatic switches in said separate circuit branches, means carried by said vehicle operating the automatic switch when gate arm has reached its predetermined end position alongside the vehicle, means carried by said vehicle maintaining a predetermined fluid pressure within said hydraulic pressure system including a pump and an electric motor, and pressure responsive switching means in said hydraulic pressure system operated by the fluid pressure prevailing controlling the energization of the electric motor, said electric motor driving said pump, said electric motor being separately connected to a source of power carried by said vehicle, said means operating the automatic switch including an operating lever moved by said crank mechanism when said crank mechanism has reached a predetermined position, said automatic switch cutting off the current supply, de-energizing said solenoids and thereby cutting off further admission of fluid to the cylinders.

WALTER E. GIESE.

References Cited in the file of this patent

UNITED STATES PATENTS

| Number | Name | Date |
|---|---|---|
| 2,148,733 | Dilley | Feb. 28, 1939 |
| 2,461,780 | Smith et al. | Feb. 15, 1949 |
| 2,497,370 | Phillips | Feb. 14, 1950 |